T. H. SCHUYLER.
SPRING WHEEL.
APPLICATION FILED MAY 19, 1921.

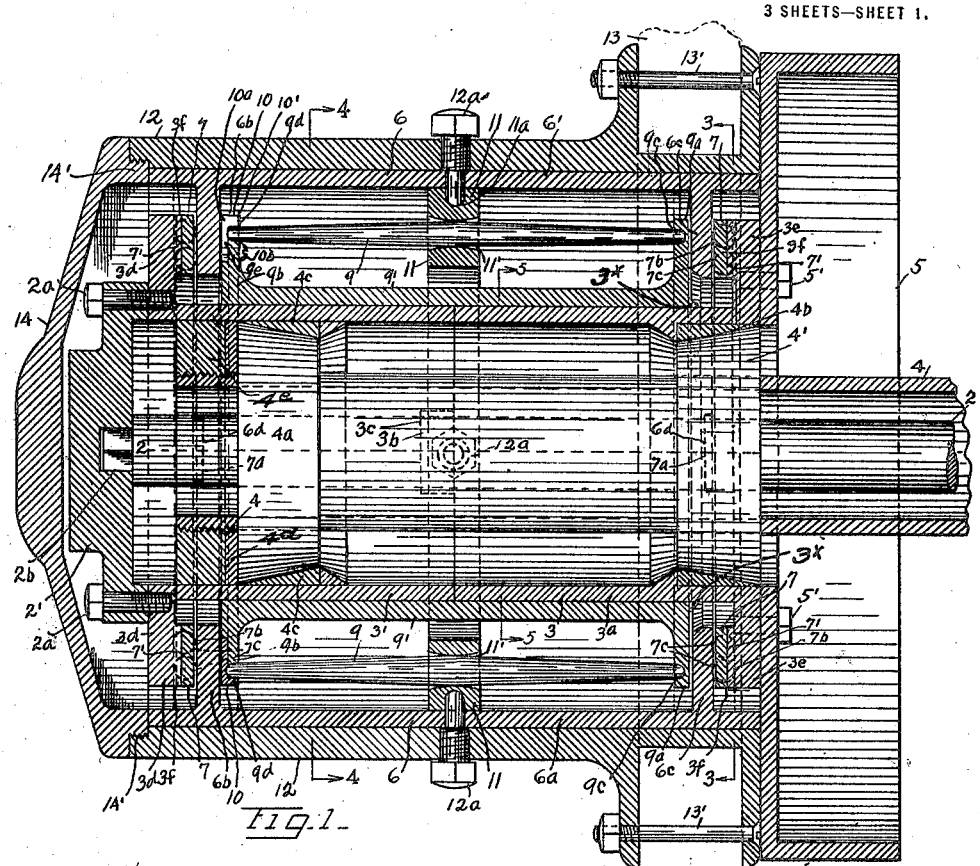

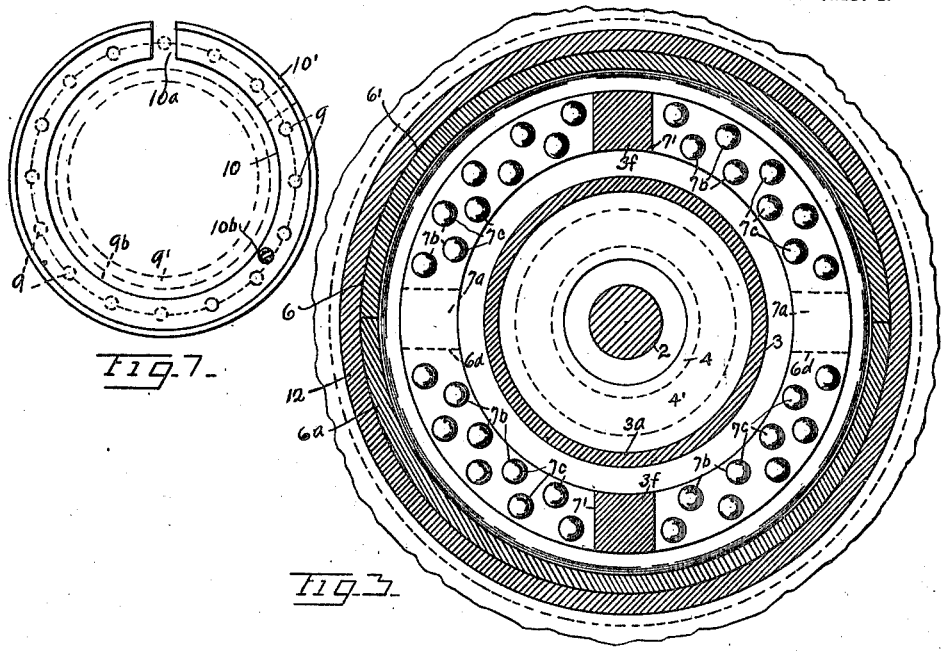

1,433,239. Patented Oct. 24, 1922.
3 SHEETS—SHEET 3.

Inventor
Theodore H. Schuyler.

By Harry L. Wallace
Attorney

Patented Oct. 24, 1922.

1,433,239

UNITED STATES PATENT OFFICE.

THEODORE H. SCHUYLER, OF SYRACUSE, NEW YORK.

SPRING WHEEL.

Application filed May 19, 1921. Serial No. 470,848.

*To all whom it may concern:*

Be it known that I, THEODORE H. SCHUYLER, a citizen of the United States, residing at Syracuse, in the county of Onondaga and State of New York, have invented certain new and useful Improvements in Spring Wheels, of which the following is a specification.

This invention relates to a spring hub designed for use in connection with automobile and auto-truck wheels, wherein the cushion means for the wheels is disposed entirely within the hub.

The object of this invention is to provide outer and inner hub-members which are resiliently connected, wherein the inner hub-member is driven directly and positively by what is known as a floating drive-shaft, and wherein the outer hub is positively driven by the inner hub by means of novel driving devices which are so constructed and arranged as to allow the outer hub-member universal movements in a common vertical plane. The further object is to provide a tubular inner hub comprising two similar sections, which when assembled are interlocked in the manner of a well-known clutch, whereby one part drives the other. A further object is to provide an outer hub-member comprising similar semi-cylindrical parts, the said member being divided substantially in the line of the longitudinal axis of the hub and drive-shaft, the halves of said outer member being held together like a sleeve, by a close fitting cylindrical outer shell which encloses all of the parts of the hub and also supports the spokes of the wheel. And a further object is to provide novel means whereby the outer hub-member drives the shell and certain other parts.

I attain these objects by the means set forth in the detailed description which follows, and as illustrated by the accompanying drawings in which—

Figure 8:
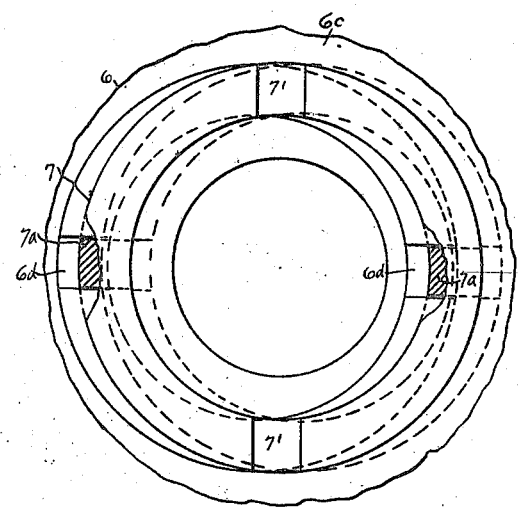
Figure 9:
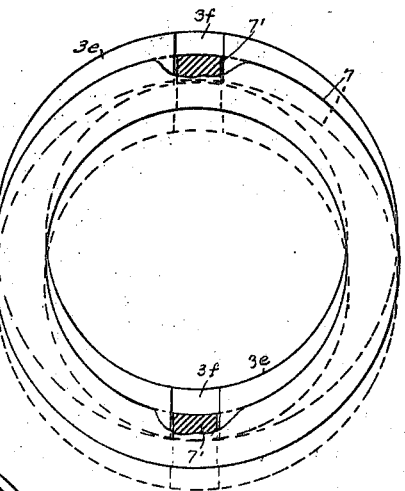
Figure 10:
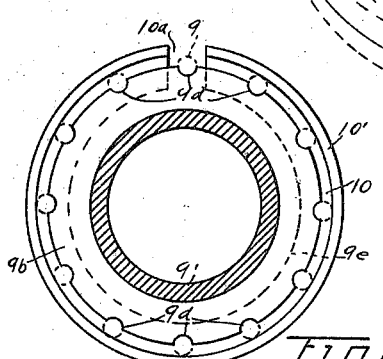

Figure 1 is a central longitudinal section through the hub. Fig. 2 is a side elevation of the inner hub-member and the means for driving the outer hub-member. Fig. 3 is a vertical cross-section taken on line 3—3 of Fig. 1. Fig. 4 is a similar cross-section taken on line 4—4 of Fig. 1. Fig. 5 is an enlarged view of one of the spring bars. Fig. 6 is a broken sectional view of the spring supporting sleeve, and Fig. 7 is a reduced face view of the split ring which retains the springs in place. Fig. 8 is a broken view of the outer hub-member and one of the driving rings; showing by full and dotted lines the driving connections between said parts. Fig. 9 is a similar view showing the driving connections between one of the driving rings and the corresponding flange of the inner hub-member. Fig. 10 is a view of one of the flanges of the spring supporting drums; showing the semi-circular notches in relation to the split ring.

In the drawings, 2 represents the shaft which drives one of the rear wheels of a motor vehicle and to which the power for propelling the vehicle is applied in a well-known manner.

3 represents the inner hub-member, having a relatively large bore which receives a smaller tubular bearing 4. The tube 4 in the present case is preferably an integral part of the usual stationary hollow rear axle which is arranged concentric to and loosely receives the driving shaft 2. The portion of the cylinder 4 within the hub is provided with oppositely facing cones 4, $4^a$, the latter being supported in tapering annular bearing rings $4^b$ and $4^c$, which snugly fit the bore of the member 3. The member 3 is preferably in two sections, as $3'$ and $3^a$, of substantially equal length, and the facing ends of said sections are provided with teeth $3^b$, and corresponding notches or sockets $3^c$, so that the part $3'$ may positively drive the part $3^a$ and the outer ends of member 3 are provided respectively with annular flanges $3^d$ and $3^e$. The sections of member 3 are provided with two oppositely arranged and corresponding radial tongues $3^f$. The member 3 is positively driven by the shaft 2, by means of a cap $2'$, which connects with the shaft 2, the said cap being rigidly secured to the outer end of the section $3'$ by bolts $2^a$. The cap $2'$ is provided with a square socket $2b$, which receives the square outer end of the shaft 2, as best seen in Fig. 1. 5 is the usual brake-drum which is preferably rigidly secured to the adjacent flange of the section $3^a$ by bolts $5'$, and is therefore driven by the member 3.

6 represents the outer hub-member which is also tubular, and the said member is preferably split longitudinally and horizontally, as shown by dotted lines in Fig. 1, and by full lines in Figs. 3 and 4, for providing top and bottom semi-cylindrical sections 6' and 6ᵃ. The member 6 is preferably substantially the same length as the member 3, and is provided with two annular internal flanges 6ᵇ and 6ᶜ, which are preferably disposed between and are spaced from the external flanges of the member 3 (see Figs. 1 and 2). The flanges 6ᵇ and 6ᶜ are provided in their outer surfaces with radial sockets or grooves 6ᵈ, which are preferably spaced 90 degrees from the corresponding parts of the member 3, as shown in Figs. 1, 2, 3, and 4. Between the flanges 3ᵈ and 3ᵉ and the flanges 6ᵇ and 6ᶜ are disposed similar rings 7. The outer faces of these rings are provided with radial sockets 7' which receive the tongues 3ᶠ, and said rings have radial tongues 7ᵃ which engage the sockets 6ᵈ, whereby the said rings drive the outer hub-member 6. In order to eliminate or reduce the friction between the rings 7 and the flanges of members 3 and 6, the said rings are provided with a plurality of sockets or perforations 7ᵇ, in which are disposed balls 7ᶜ which also sustain the end thrusts of the adjacent parts. By disposing the two sets of tongues and grooves of the rings 7 and the flanges of the members 3 and 6 at right angles, the said members are allowed practically universal movements in a common vertical plane, while the wheel is rotating and doing its work. This is a very desirable feature, because it eliminates most of the trouble and injurious effects produced by the constant jars and shocks so common to all motor vehicle wheels, and particularly to the heavier and more rigid wheels employed on motor trucks.

The resilient connection between the inner and the outer hub-members 3 and 6 consists of a plurality of similar spring-bars 9, which are disposed in an annular row, in which said springs are preferably regularly spaced and are positioned about midway between the outer surface of the member 3 and the inner surface of the member 6, as shown in Figs. 1, 3, and 4. The springs 9 are relatively thick intermediate their ends and then taper gradually towards the said ends, and the said springs are preferably round. 9' represents a drum or sleeve which is provided at its opposite ends with external integral flanges 9ᵃ and 9ᵇ, which support the springs 9. The inner face of the flange 9ᵃ is provided with circular sockets 9ᶜ, which receive and support the corresponding ends of the springs 9. The flange 9ᵇ is provided in its peripheral edges with semi-circular notches or grooves 9ᵈ, whch receive and support the opposite ends of the springs 9. The latter ends of the springs 9 are held in place by a ring 10, which is rotatable in an annular recess 9ᵉ formed in the outer face of the flange 9ᵇ, as best seen in Fig. 1. The ring 10 is provided with a peripheral flange 10', which overlaps the adjacent ends of the springs 9 and serves to hold the springs in the sockets 9ᵈ. The ring 10 is split radially, as best shown in Fig. 7, for providing a gap 10ᵃ through which the ends of the springs may be passed when applying and removing the springs. In case one of the springs 9 breaks, the ring 10 may be rotated until the gap 10ᵃ registers with the corresponding socket 9ᵈ, (see Fig. 7). The spring may then be moved endwise towards the ring 10 until it is freed. After a new spring is placed in position, the ring 10 is rotated sufficiently to position the gap 10ᵃ midway between two of the springs, (see dotted lines Fig. 7) and then a screw 10ᵇ carried by the flange 9ᵇ is driven into a threaded hole in the ring 10 for rigidly holding the ring in the idle position. 11 represents a ring which loosely surrounds the drum 9' and preferably snugly fits the bore of the hub-member 6. The ring 11 is provided with a number of equally spaced perforations 11', which receive the thickened middle portions of the springs 9. These perforations are preferably conical at both ends, so that the springs 9 have relatively narrow bearings in the said ring. The flaring of the perforations 11' also facilitates the insertion and removal of the springs. The entire weight of the vehicle and its load is carried by the springs 9. Surrounding the split hub-member 6 is a close-fitting tubular shell 12. whose inner end is provided with an annular recess or groove in which the spokes 13 (shown in dotted lines in Fig. 1) are disposed, and held in place by bolts 13'. The outer end of the shell 12 is threaded internally to receive the corresponding threaded portion 14' of a dust-cap 14, which completely closes the outer end of the hub. The shell 12 is rigidly but detachably secured to the hub-member 6 by a series of bolts 12ᵃ, which pass through threaded holes in the shell, and whose inner ends which are preferably reduced and plain, pass through registering perforations in the member 6. The inner ends of the bolts 12ᵃ enter corresponding sockets 11ᵃ in the periphery of the ring 11, and prevent the said ring from moving except with the member 6 and the shell 12.

To assemble my improved hub, the section 3ᵃ of the inner hub 3 is first slipped over the cone 4' of the axle 4 after the ring 4ᵇ has been placed on said cone. The brake-drum 5 may be bolted to the flange 3ᵇ of the section 3ᵃ. One of the rings 7, with the balls 7ᶜ, in place, is next slipped over the barrel of the section 3'. The drum or sleeve 9' together with the ring 11 and the full quota of springs 9, all having been previously assembled as shown in Fig. 1, are next slipped over the hub section 3' until the drum 9' comes to a stop against an annular rib 3ˣ of the section 3ᵃ. The other ring 7 with the balls 7ᶜ assembled is next applied to the section 3ᵃ of the hub-member 3. This is followed by the insertion of the section 3ᵃ of the hub-member 3 into the part 9' until the teeth 3ᵇ engage the sockets 3ᶜ. The cone 4ᵃ with the bearing-ring 4ᶜ in place is then applied to the outer threaded end of the axle 4. This is followed by the applying of a packing ring 4ᵈ and a nut 4ᵉ, which serve to hold the cones and the bearing-rings in the operative positions, as shown. The next step is to apply the cap 2' to the end of the shaft 2 and secure the said cap to the outer end of the sleeve 3' by means of the bolts 2ᵃ. The next step consists of applying the bottom section 6ᵃ of the split outer hub-member to the under side of the hub, after which the opposite section 6' is applied to the top side of the hub. The outer shell 12 is next placed in position, and the bolts 12ᵃ applied, as shown in Fig. 1. The last step in the assembling of the hub consists of applying the dust-cap 14.

The disposing of the rings 7 at the opposite ends of the inner and outer hub members, not only affords a positive and powerful driving means, but by locating the said rings as herein shown and described, the power is so applied as to distribute the strain throughout the entire hub. This balancing or equalizing of the driving strain prevents the resilient parts from being cramped. This greatly enhances the value of the springs 9, and also minimizes breakage and deterioration of the parts.

Having thus described my invention, what I claim, is:—

1. A spring wheel comprising an inner hub-member, an outer hub-member, a tubular member having external flanges disposed between said members, one of said flanges having a plurality of sockets, the other flange having an equal number of peripheral grooves, a plurality of spring bars supported at their ends by said sockets and grooves, and a perforated ring disposed between said outer hub-member and said tubular member for supporting the middle portions of said springs.

2. A spring wheel including a sectional inner hub-member, a split outer hub-member, a tubular part having external annular flanges disposed between said hub-members, means for resiliently connecting said tubular part and said split outer hub-member, and devices disposed at the opposite ends of the hub-members adapted to drive said outer hub-member.

3. In a spring wheel, the combination with an inner hub member comprising two interlocked sections, and an outer hub member comprising two semi-cylindrical sections, of a tubular member having external flanges disposed between said hub-members, one of said flanges having a plurality of sockets, the other flange having an equal number of peripheral grooves, a plurality of spring bars supported at their ends by said sockets and grooves, a movable split ring for holding said springs in place, and an annular part supporting said outer hub-member and supported by the middle portions of said springs.

4. In a spring wheel the combination with an inner hub-member arranged in separable alining sections, an outer hub-member, and a tubular member having external flanges disposed between said hub-members, of a plurality of spring-bars equally spaced and supported at their ends by said external flanges, a split ring carried by one of said flanges and cooperating with said flanges for holding the springs in place, and means interposed between and positively connecting said outer hub-member and said spring bars.

5. In a spring wheel the combination with an inner hub-member having external flanges at its opposite ends, and an outer hub-member having internal flanges disposed between the flanges of the inner member, of rings disposed between the adjacent flanges of said hub-members, balls carried by said rings for reducing the friction between the rings and said flanges, means for inter-locking said rings with the flanges of said hub-members, whereby the outer hub-member is driven positively by the inner hub-member, a tubular member telescoping said inner hub-member, a plurality of spring bars supported at their ends by said tubular member, and an annular part secured to the outer hub-member and supporting the medial portions of said springs.

6. A spring wheel comprising a sectional inner hub-member, said sections disposed end to end and one of said sections adapted to drive the other section, a hollow cylinder having external flanges telescoping said inner hub-member, a plurality of spring bars supported at their ends by said external flanges, a split hub-member, an annular support for the intermediate portions of said springs, said support snugly fitting the bore of said split hub-member and loosely fitting said cylinder, similar rings disposed concentric to said hub-members, the said rings provided with tongues and grooves which interlock with corresponding parts of said hub-members, whereby the said outer hub-member is driven positively by said inner hub-member.

7. A spring wheel including an inner hub-member comprising similar axially alining sections, one of said sections adapted to drive the other section, a drive shaft, means for connecting said shaft with said inner hub-member, whereby said shaft positively drives said member, rings surrounding the opposite ends of said inner hub-sections, means for interlocking said rings with said inner hub-members, a tubular part mounted on said inner hub-member and having external flanges, a plurality of spring bars supported at their ends by said flanges, an annular part supported by the intermediate portions of said springs, an outer hub-member split longitudinally to provide similar semi-cylindrical sections, said outer hub-member having spaced internal annular flanges which are adjustably interlocked to the said rings, and a cylindrical shell surrounding said outer hub-member and movable therewith.

8. A spring wheel including an inner hub-member comprising similar axially alining sections, one of said sections adapted to drive the other section, a drive shaft, means for connecting said shaft with said inner hub-member, whereby said shaft positively drives said member, rings surrounding the opposite ends of said inner hub-member, means for interlocking said rings with said inner hub-member, whereby said rings are driven by said hub-member, a tubular part closely telescoping said inner hub-member and having external flanges, one of said flanges having a plurality of sockets, the other flange having an equal number of peripheral grooves, a plurality of spring-bars supported at their ends by said sockets and grooves, a perforated annular part supported by the intermediate portions of said springs, an outer hub-member comprising similar semi-cylindrical sections, said outer hub-member having two internal annular flanges, the corresponding faces of said flanges having radial grooves which interlock with corresponding tongues carried by said rings, whereby said rings drive said outer hub-member, and said outer hub-member being supported on said perforated annular part.

9. A spring wheel comprising an inner hub-member having external flanges at its opposite ends provided with radial tongues, said member being split vertically to provide similar sections having teeth and sockets at their meeting ends for interlocking said sections, an outer hub-member split horizontally to provide similar semi-cylindrical sections having internal flanges which are disposed between the flanges of the inner hub, the said internal flanges having radial grooves disposed at right angles to the tongues of the inner hub-members, rings disposed between the flanges of the said hub-members, said rings having radial grooves to receive the tongues of the inner hub-member, and having radial tongues which are received by the grooves of the internal flanges, balls carried by the said rings for reducing the friction between said rings and said external and internal flanges, a plurality of springs arranged in an annular row concentric to the said hub-members, the ends of said springs being supported by the said inner hub-member, and an annular part telescoping and supporting said outer hub-member, the said annular part being supported by the middle portions of said springs.

In testimony whereof I affix my signature.

THEODORE H. SCHUYLER.